United States Patent
Goeschel et al.

(10) Patent No.: US 11,292,868 B2
(45) Date of Patent: *Apr. 5, 2022

(54) POLYURETHANE SYSTEM WITH LONG POT LIFE AND RAPID HARDENING

(71) Applicant: BASF SE, Ludwigshafen (DE)

(72) Inventors: Julia Goeschel, Bremen (DE); Markus Schuette, Melle (DE); Berend Eling, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 595 days.

This patent is subject to a terminal disclaimer.

(21) Appl. No.: 15/100,091

(22) PCT Filed: Nov. 19, 2014

(86) PCT No.: PCT/EP2014/074983
§ 371 (c)(1),
(2) Date: May 27, 2016

(87) PCT Pub. No.: WO2015/078740
PCT Pub. Date: Jun. 4, 2015

(65) Prior Publication Data
US 2017/0267806 A1  Sep. 21, 2017

(30) Foreign Application Priority Data
Nov. 29, 2013  (EP) .................................... 13195137

(51) Int. Cl.
| | | |
|---|---|---|
| *C08G 18/67* | (2006.01) | |
| *C08G 18/10* | (2006.01) | |
| *C08G 18/22* | (2006.01) | |
| *C08G 18/09* | (2006.01) | |
| *C08G 18/58* | (2006.01) | |
| *C08G 18/40* | (2006.01) | |
| *C08G 18/32* | (2006.01) | |
| *C08G 18/42* | (2006.01) | |
| *C08G 18/76* | (2006.01) | |
| *C08G 18/78* | (2006.01) | |
| *B29C 70/48* | (2006.01) | |
| *B29K 75/00* | (2006.01) | |

(52) U.S. Cl.
CPC ......... *C08G 18/675* (2013.01); *C08G 18/092* (2013.01); *C08G 18/10* (2013.01); *C08G 18/225* (2013.01); *C08G 18/3206* (2013.01); *C08G 18/3218* (2013.01); *C08G 18/4045* (2013.01); *C08G 18/4236* (2013.01); *C08G 18/58* (2013.01); *C08G 18/7671* (2013.01); *C08G 18/78* (2013.01); *B29C 70/48* (2013.01); *B29K 2075/00* (2013.01); *B60Y 2410/122* (2013.01); *C08G 2115/02* (2021.01)

(58) Field of Classification Search
CPC .... C08G 18/16; C08G 18/161; C08G 18/166; C08G 18/168; C08G 18/22; C08G 18/225; C08G 18/675; C08G 18/6674; C08G 18/3206; C08G 18/4045
USPC .................................................. 528/55, 57
See application file for complete search history.

(56) References Cited

U.S. PATENT DOCUMENTS

| | | | | |
|---|---|---|---|---|
| 3,883,571 | A |  | 5/1975 | Allport et al. |
| 4,229,347 | A |  | 10/1980 | Holt et al. |
| 4,931,483 | A | * | 6/1990 | Matsuoka ............. C08F 283/06 521/137 |
| 5,079,329 | A | * | 1/1992 | Muhlfeld ................. C08K 7/28 528/61 |
| 5,326,833 | A | * | 7/1994 | Parodi .................. C08G 18/003 525/528 |
| 5,354,499 | A | * | 10/1994 | Elliott .................. C09K 19/322 252/299.5 |
| 5,804,511 | A | * | 9/1998 | Kelman ................ B29C 67/246 442/172 |
| 5,830,541 | A | * | 11/1998 | Carswell ................ B05D 1/045 427/475 |

(Continued)

FOREIGN PATENT DOCUMENTS

| | | | | |
|---|---|---|---|---|
| CN | 102405244 | A |  | 4/2012 |
| DE | 3916873 | A1 | * | 12/1989 ......... C08G 18/8019 |

(Continued)

OTHER PUBLICATIONS

Huntsman, "Carbalink HPC Hydroxypropyl Carbamate", Published Feb. 1, 2002, Accessed Sep. 28, 2018, <http://www.huntsman.com/portal/page/portal/1DC4CAA66CA104FDE0532C6BEBCDCF45>. (Year: 2002).*
Marx, Matthias, "Machine translation of DE 3916873 A1," Translated Mar. 7, 2021, Espacenet.com (Year: 2021).*
U.S. Appl. No. 14/901,138, filed Dec. 28, 2015, US-2016-0137892-A1, Berend Eling, et al.
Dr. W. Diller, et al., Kunststoffhandbuch, Band 7, Polyurethane, 1993, Kapitel 3.1, 21 pages.
Kunststoffhandbuch, Band 7, Polyurethane, 1993, Kapitel 3.4.4, 5 pages.
Kunststoffhandbuch, Band 7, Polyurethane, 1993, Kapitel 3.4.6 and 3.4.11, 9 pages.

(Continued)

*Primary Examiner* — Francisco W Tschen
*Assistant Examiner* — Sonny V Nguyen
(74) *Attorney, Agent, or Firm* — Armstrong Teasdale LLP

(57) ABSTRACT

The present invention relates to a process for preparing polyurethanes by mixing a) polyisocyanate, b) a mixture obtainable by introducing an alkali metal or alkaline earth metal salt into a compound comprising urethane groups, c) compounds comprising one or more epoxide groups, and, optionally, d) polyol, e) chain extenders, and f) fillers and further additives to form a reaction mixture and fully reacting the mixture to give the polyurethane, where the amount of alkali metal or alkaline earth metal ions per equivalent urethane groups in the compound (b) is 0.0001 to 3.5. The present invention further relates to a polyurethane obtainable by such a process, and to the use of such a polyurethane for producing bodywork components for vehicles.

22 Claims, No Drawings

(56) References Cited

U.S. PATENT DOCUMENTS

| | | |
|---|---|---|
| 2012/0046436 A1 | 2/2012 | Debien et al. |
| 2013/0303694 A1 | 11/2013 | Debien et al. |
| 2014/0371406 A1* | 12/2014 | Esbelin .............. C08G 18/6685 525/528 |

FOREIGN PATENT DOCUMENTS

| | | |
|---|---|---|
| EP | 2 257 530 | 12/2010 |
| WO | WO 02/10250 A1 | 2/2002 |
| WO | WO 2010/121898 A1 | 10/2010 |
| WO | WO 2011/107367 A1 | 9/2011 |
| WO | WO 2012/103965 A1 | 8/2012 |
| WO | WO 2013/098034 A1 | 7/2013 |
| WO | WO 2013/110512 A1 | 8/2013 |
| WO | WO 2013/127647 A1 | 9/2013 |
| WO | WO 2013/143841 A1 | 10/2013 |

OTHER PUBLICATIONS

International Search Report and Written Opinion of the International Searching Authority dated Jan. 19, 2015 in PCT/EP2014/074983 filed Nov. 19, 2014.

International Preliminary Report on Patentability dated Feb. 10, 2016 in PCT/EP2014/074983 filed Nov. 19, 2014 (with English translation).

* cited by examiner

POLYURETHANE SYSTEM WITH LONG POT LIFE AND RAPID HARDENING

The present invention relates to a process for preparing polyurethanes by mixing a) polyisocyanate, b) a mixture obtainable by introducing an alkali metal or alkaline earth metal salt into a compound comprising urethane groups, c) compounds comprising one or more epoxide groups, and, optionally, d) polyol, e) chain extenders, and f) fillers and further additives to form a reaction mixture and fully reacting the mixture to give the polyurethane, where the amount of alkali metal or alkaline earth metal ions per urethane group in the compound (b) is 0.0001 to 3.5. The present invention further relates to a polyurethane obtainable by such a process, and to the use of such a polyurethane for producing bodywork components for vehicles.

Particularly for the production of fiber composites of large surface area, a polymeric system is required, as matrix system, that exhibits a long open time in conjunction with constantly low viscosity, so that the reinforcing means, such as glass or carbon fibers or fiber mats, are fully wetted before the polymeric system cures to give the finished polymer. At the same time, however, there is also a requirement that the polymeric systems should cure extremely rapidly to form the polymer, hence allowing quicker cycle times and thus raising the profitability. In general, the long open time is achieved only by epoxide systems or polyether systems, but these systems generally require long cure times.

One possibility for extending the open time in conjunction with rapid curing on the part of polyurethane systems is to use acid-blocked catalysts. For instance, EP 2257580 describes the use of acid-blocked amine catalysts in polyurethane systems for producing sandwich components. Acid-blocked catalysts, however, extend the working time only by minutes. The requirement, in contrast, is for a processing life of up to several hours.

WO 10121898 describes a polyisocyanate component consisting in parts of a urea prepolymer (—NH—CO—NH—) which is bidentate in terms of the anion and which has been mixed with lithium chloride. When this component is mixed with a second component that comprises diglycidyl ether and polyol, and when this mixture is heated to 80-90° C., there is a rapid reaction that leads to volume curing of the material.

WO 12103965 describes an epoxy-based system which is based on the same catalysis as described in WO 10121898. In this case the groups necessary for the catalysis are defined here via the two H atoms located on the nitrogen as carboxamide group (—CO—NH$_2$), which is bidentate in terms of the anion, with LiCl.

WO 13098034 comprises a reactive mixture which in addition to lithium halide requires a group which is bidentate —(—CO—NH—CO—)—in terms of the cation. The urea component described in this specification may also comprise polydentate biuret groups (—NH—CO—NH—CO—NH—).

WO 13143841 describes a trimerization catalyst consisting of alkali metal or alkaline earth metal salts in combination with carboxamide groups that are bidentate relative to the anion and that have the structure —CO—NH2, or in combination with groups —(—CO—NH—CO—)—, whose behavior is bidentate in terms of the cation.

Disadvantages of the systems described in WO 10121898, WO 12103965 WO 13098034, and WO 13143841 are that the urea, carboxylate or biuret blocked catalysts must be added in relatively large quantities in order to exert sufficient activity, and that relatively brittle materials are obtained.

It was an object of the present invention, therefore, to provide a polyurethane system which has a long open time, can be cured within a few minutes, and exhibits heightened efficiency of the catalysis by comparison with WO 10121898, WO 12103965 WO 13098034, and WO 13143841. This polyurethane system is to allow the production of polyurethanes having a wide range of different mechanical properties.

The object of the invention has been achieved by means of a polyurethane system comprising a) polyisocyanate, b) a mixture obtainable by introducing an alkali metal or alkaline earth metal salt into a compound comprising urethane groups, c) compounds comprising one or more epoxide groups, and, optionally, d) polyol, e) chain extenders, and f) fillers and further additives, where the amount of alkali metal or alkaline earth metal ions per urethane group in the compound (b) is 0.0001 to 1. The present invention further relates to a process for preparing polyurethanes, wherein the components of a polyurethane system of the invention are mixed to form a reaction mixture which is fully reacted to give the polyurethane.

Surprisingly it has been found that components (b) must be present in a small amount than the bidentate or polydentate complexes from the prior art. Here, in contrast to the systems described in WO 10121898, WO 12103965 WO 13098034, and WO 13143841, exclusively monodentate urethane groups of the form R—NH—CO—O—R are used in relation to the salt anion and the salt cation, with R being other than hydrogen. This leads to an efficiency increased by a factor of 10, based on the concentration of the catalyst, or to an efficacy increased by a factor of 3, relative to the open time at 130° C. One possible explanation for this might be that the bidentate or polydentate complexes from the prior art are capable of binding the salt compounds relatively strongly via electrostatic interactions.

Polyisocyanates (a) include all aliphatic, cycloaliphatic, and aromatic isocyanate known for the preparation of polyurethanes. They preferably have an average functionality of less than 2.5. Examples are 2,2'-, 2,4'-, and 4,4'-diphenylmethane diisocyanate, the mixtures of monomeric diphenylmethane diisocyanates and more highly polycyclic homologs of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI), or mixtures thereof.

Preference as polyisocyanates (a) is given to using monomeric diphenylmethane diisocyanate, as for example 2,2'-diphenylmethane diisocyanate, 2,4'-diphenylmethane diisocyanate, 4,4'-diphenylmethane diisocyanate, or mixtures thereof. Diphenylmethane diisocyanate may also be used here as a mixture with its derivatives. In that case diphenylmethane diisocyanate may more preferably comprise up to 10 wt %, more preferably still up to 5 wt %, of carbodiimide, uretdione-, or uretonimine-modified diphenylmethane diisocyanate, especially carbodiimide modified diphenylmethane diisocyanate.

Polyisocyanates (a) may also be used in the form of polyisocyanate prepolymers. These polymers are obtainable by reaction of above-described polyisocyanates (constituent (a-1)) in excess, at temperatures for example of 30 to 100° C., preferably at about 80° C., with polyols (constituent (a-2)), to give the prepolymer. The NCO content of polyisocyanate prepolymers of the invention is preferably from 5 to 32 wt % NCO, more preferably from 15 to 28 wt % NCO.

Polyols (a-2) are known to the skilled person and are described for example in "Kunststoffhandbuch, 7, Polyurethane", Carl Hanser-Verlag, 3rd edition 1993, section 3.1. As polyols it is accordingly possible, for example, to use polyether- or polyesterols, such as the polyols described below under (d). As polyols (a-2), preference is given to using polyols containing secondary OH groups, such as polypropylene oxide, for example. These polyols (a-2) preferably possess a functionality of 2 to 6, more preferably of 2 to 4, and more particularly 2 to 3. With particular preference the polyols (a-2) comprise polyesterols comprising hydrophobic substances, as described under (b).

It is additionally possible, optionally, for chain extenders (a-3) to be added to the reaction to give the polyisocyanate prepolymer. Chain extenders (a-3) suitable for the prepolymer are dihydric or trihydric alcohols, as for example dipropylene glycol and/or tripropylene glycol, or the adducts of dipropylene glycol and/or tripropylene glycol with alkylene oxides, preferably dipropylene glycol. Suitable chain extenders are also described under (e).

Such polyisocyanate prepolymers are described for example in U.S. Pat. No. 3,883,571, WO 02/10250, and U.S. Pat. No. 4,229,347.

Particularly preferred for use as polyisocyanate (a) is diphenylmethane diisocyanate or a polyisocyanate prepolymer based on monomeric 4,4'-diphenylmethane diisocyanate or mixtures of 4,4'-diphenylmethane diisocyanate with its derivatives and polypropylene oxide having a functionality of 2 to 4, and also, optionally, dipropylene glycol or monomeric.

Employed as component (b) is a mixture obtainable by introducing an alkali metal or alkaline earth metal salt into a compound comprising urethane groups.

Employed as alkali metal or alkaline earth metal salt here is a compound which accelerates the reaction between isocyanates (a), the compounds (c) comprising one or more epoxide groups, and, optionally, polyols (d). These compounds include, in particular, salts of sodium, lithium, magnesium, and potassium, and ammonium compounds, preferably lithium or magnesium, with any desired anions, preferably with anions of organic acids such as carboxylates, and more preferably of inorganic acids, such as nitrates, halides, sulfates, sulfites, and phosphates and even more preferably with anions of monoprotic acids, such as nitrates or halides, and especially nitrates, chlorides, bromides or iodides. Particular preference is given to using lithium chloride, lithium bromide, and magnesium dichloride, and especially to lithium chloride. Alkali metal or alkaline earth metal salts of the invention may be used individually or as mixtures.

Preferably, besides the alkali metal or alkaline earth metal salt, there are no further compounds used which accelerate the reaction of isocyanates with isocyanate-reactive groups.

Compound comprising urethane groups is taken to mean any desired compounds which are in solid or liquid form at 20° C. and which comprise at least one urethane group R-'R—NH—CO—O—R', where R is other than hydrogen and/or other than COR". The compound comprising urethane groups in component (h) here is obtainable preferably by reaction of a second polyisocyanate with a compound having at least one OH group. Preferred in this context are compounds which are liquid at 50° C., more preferably those liquid at room temperature. For the purposes of the present invention, a "liquid" substance or component here is one which at the stated temperature has a viscosity of not more than 10 Pas. When no temperature is stated, the datum is based on 20° C. The measurement is made according to ASTM D445-11. The compounds comprising urethane groups preferably have at least two urethane groups. The molecular weight of the compounds comprising urethane groups here is preferably in the range from 200 to 15 000 g/mol, more preferably 300 to 10 000 g/mol, and more particularly 500 to 1300 g/mol. Compounds comprising urethane groups may be obtained, for example, by reaction of aforementioned isocyanates (al) as second isocyanate with compounds having at least one isocyanate-reactive hydrogen atom, such as alcohols, monoalcohols for example, such as methanol, ethanol, propanol, butanol, pentanol, hexanol, or longer-chain propoxylated or ethoxylated monools, such as poly(ethylene oxide) monomethyl ether, such as the monofunctional Pluriol® products from BASF, for example, dialcohols, such as ethylene glycol, diethylene glycol, triethylene propylene glycol, dipropylene glycol, butanediol, hexanediol, and/or reaction products of said isocyanates with the polyols (d) and/or chain extenders (e) described below—individually or in mixtures. For preparing the compound containing urethane groups, both isocyanates and polyols can be used in a stoichiometric excess. Where monoalcohols are used, isocyanate groups and OH groups may also be used in a stoichiometric ratio. Where the compound containing urethane groups has two or more isocyanate groups per molecule, they may wholly or partly replace the polyisocyanates (a). The reaction takes place customarily at temperatures between 20 and 120° C., as for example at 80° C. The second isocyanate, used for preparing the compound comprising urethane groups, is preferably an isomer or homolog of diphenylmethane diisocyanate. More preferably the second isocyanate is monomeric diphenylmethane diisocyanate, as for example 2,2'-diphenylmethane diisocyanate, 2,4'-diphenylmethane diisocyanate, 4,4'-diphenylmethane diisocyanate, or any mixtures thereof. Diphenylmethane diisocyanate here may be used additionally as a mixture with its derivatives. In this case it is possible for diphenylmethane diisocyanate to comprise more preferably up to 10 wt %, more preferably still up to 5 wt %, of carbodiimide, uretdione-, or uretonimine-modified diphenylmethane diisocyanate, more particularly carbodiimide-modified diphenylmethane diisocyanate. In one particular preferred embodiment the first isocyanate (a) and the second isocyanate for preparing the compound containing urethane groups are identical.

The compound containing urethane groups can also be obtained via alternative reaction pathways, as for example by reacting a carbonate with a monoamine to form a urethane group. For this reaction, for example, a propylene carbonate in a slight excess (1.1 eq) is reacted with a monoamine, as for example a Jeffamin M 600, at 100° C. The resulting urethane may likewise be used as compound comprising urethane group.

The mixtures comprising the alkali metal or alkaline earth metal salt and a compound comprising urethane groups may be obtained, for example, by mixing the alkali metal or alkaline earth metal salt into the compound comprising urethane groups, at room temperature or at elevated temperature, for example. For this purpose it is possible to use any mixer, an example being a simple stirrer. The alkali metal or alkaline earth metal salt in this case may be used as the pure substance or in the form of a solution, an example being a solution in mono- or polyfunctional alcohols, such as methanol, ethanol, or chain extenders (e), or water. In one particularly preferred embodiment, commercially available prepolymer-based isocyanate is admixed directly with the dissolved salt. Suitability for this purpose is possessed, for example, by isocyanate prepolymers having an NCO content of 15 to 30%, based more particularly on diphenylmethane diisocyanate and on a polyether polyol. Isocyanates of this kind are available commercially, for example, from BASF under the trade name Lupranat® MP 102.

In one particularly preferred embodiment of the present invention, the alkali metal or alkaline earth metal salt is dissolved in a compound having isocyanate-reactive hydrogen atoms, and this solution is then mixed, optionally at elevated temperature, with the isocyanate.

Particular preference for preparing the compound containing urethane groups is given to using a monool having a molecular weight of 30 to 15 000 g/mol, preferably 100 to 900 g/mol and, in one particularly preferred version, from 400 to 600 g/mol.

The amount of alkali metal or alkaline earth metal ions per urethane group in the compound (b) is 0.0001 to 3.5, preferably 0.01 to 1.0, more preferably 0.05 to 0.9, and more particularly 0.1 to 0.8, based in each case on the number of alkali metal or alkaline earth metal ions and urethane groups (per equivalent of urethane groups).

The amount of alkali metal or alkaline earth metal ions per isocyanate group in the first polyisocyanate (a) and, if present, in the complex compound (b) is preferably 0.0001 to 0.3, more preferably 0.0005 to 0.02, and more particularly 0.001 to 0.01 equivalents, based in each case on the number of alkali metal or alkaline earth metal ions and urethane groups.

Between the alkali metal or alkaline earth metal salt in the mixture (b), preferably at 25° C., there is a thermally reversible interaction with the urethane group-containing compounds as component (b), while at temperatures greater than 50° C., preferably from 60 to 200° C. and more particularly from 80 to 200° C., the catalytically active compound is in free form. In the sense of the invention, a thermally reversible interaction is assumed here when the open time of the reaction mixture at 25° C. is longer by a factor of 5, more preferably by a factor of at least 10, and more particularly by a factor of at least 20, than at 130° C. This open time is defined as the time within which the viscosity of the reaction mixture at constant temperature increases to an extent such that the stirring force required exceeds the given stirring force of the Shyodu gel timer, type 100, version 2012. For this purpose, a 200 g portion of reaction mixture was prepared, was mixed in a Speedmixer at 1950 rpm for 1 minute, and 130 g of the mixture were stirred at room temperature or elevated reaction temperature in an oven, in a PP plastic beaker with a diameter of 7 cm, using a Shyodu gel timer, type 100, version 2012 and an associated wire stirrer at 20 rpm, until the viscosity and hence the required stirring force for the reactive mixture exceeded the stirring force of the gel timer.

As compound (c) comprising one or more epoxide groups it is possible to use all epoxide-containing compounds which are customarily used for preparing epoxy resins. The compound (c) comprising epoxide groups are preferably liquid at 25° C. Here it is also possible to use mixtures of such compounds, these mixtures being preferably likewise liquid at 25° C.

Examples of such compounds containing epoxide groups and able to be used for the purposes of the invention are
I) Polyglycidyl and poly([beta]-methylglycidyl) esters, obtainable by reacting a compound having at least two carboxyl groups in the molecule and in each case epichlorohydrin or [beta]-methylepichlorohydrin. This reaction is advantageously catalyzed by the presence of bases.

Aliphatic polycarboxylic acids can be used, for example, as compound having at least two carboxyl groups. Examples of such aliphatic polycarboxylic acids are oxalic acid, succinic acid, glutaric acid, adipic acid, pimelic acid, suberic acid, azelaic acid, and dimerized or trimerized linoleic acid. Further it is possible as well to use cyclic aliphatic acids, such as tetrahydrophthalic acid, 4-methyftetrahydrophthalic acid, hexahydrophthalic acid or 4-methylhexahydrophthalic acid. Aromatic carboxylic acids as well, such as phthalic acid, isophthalic acid or terephthalic acid, and also any desired mixtures of these carboxylic acids, can be used.
II) Polyglycidyl or poly([beta]-methylglycidyl) ethers, obtainable by reaction of a compound having at least two alcohol hydroxyl groups and/or phenolic hydroxyl groups with epichlorohydrin or [beta]-methylepichlorohydrin under alkaline conditions or in the presence of an acidic catalyst and subsequent treatment with a base.

The glycidyl ethers of this type are derived, for example, from linear alcohols, such as ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycol, pentane-1,5-diol, hexane-1,6-diol, hexane-2,4,6-triol, glycerol, 1,1,1-trimethylolpropane, pentaerythritol or sorbitol, and from polyepichlorohydrins.

Further glycidyl ethers of this type are obtainable from cycloaliphatic alcohols, such as 1,4-cyclohexanedimethanol, bis(4-hydroxycyclohexyl)methane or 2,2-bis(4-hydroxycyclohexyl)propane, or from alcohols which carry aromatic groups and/or other functional groups, such as N,N-bis(2-hydroxyethyl)aniline or p,p'-bis(2-hydroxyethylamino)diphenylmethane.

The glycidyl ethers may also be based on monocyclic phenols, such as p-tert-butylphenol, resorcinol or hydroquinone, or on polycyclic phenols, such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further compounds which contain hydroxyl groups and which are suitable for preparing the glycidyl ethers are novolaks, obtainable by condensing aldehydes, such as formaldehyde, acetaldehyde, chloraldehyde or furfuraldehyde, with phenols or bisphenols, which may be unsubstituted or substituted, as for example by chlorine atoms or C1 to C9 alkyl groups, such as phenol, 4-chlorophenol, 2-methylphenol or 4-tert-butylphenol.
III) Poly(N-glycidyl) compounds, obtainable by dehydrochlorination of reaction products of epichlorohydrin with amines which contain at least two amine-bonded hydrogen atoms. Examples of such amines are aniline n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of cycloalkyleneureas, such as ethyleneurea or 1,3-propyleneurea, and diglycidyl derivatives of hydantoins, such as 5,5-dimethylhydantoin.
IV) Poly(S-glycidyl) compounds, such as di-S-glycidyl derivatives which are obtainable from dithiols, as for example ethane-1,2-dithiol or bis(4-mercaptomethylphenyl) ether.
V) Cycloaliphatic epoxy resins, such as bis(2,3-epoxycyclopentyl) ether, 2,3-epoxycyclopentyl glycidyl ether, 1,2-bis (2,3-epoxycyclopentyloxy)ethane or 3,4-epoxycyclohexylmethyl 3',4'-epoxycyclohexanecarboxylate.
VI) Monofunctional epoxy resins, such as (2-ethylhexyl) glycidyl ether, isopropyl glycidyl ether, butyl glycidyl ether or cresyl glycidyl ether.

Within the bounds of the invention it is likewise possible to use epoxy resins in which the 1,2-epoxy group is bonded to different heteroatoms or functional groups. These compounds include N,N,O-triglycidyl derivative of 4-aminophenol, the glycidyl ether/glycidyl esters of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Particularly preferred as component (c) are the compounds of classes (I) and (II), especially those of class (II).

The compound (c) comprising one or more epoxide groups is used preferably in an amount such that the equivalent ratio of epoxide group to isocyanate group of the polyisocyanates (a) and also, optionally, isocyanate groups present in the complex compound (b) is 0.1 to 2.0, preferably 0.2 to 1.8, and more preferably 0.3 to 1.0. A high epoxide fraction here leads to a greater exothermicity and hence, in general, to more rapid curing at elevated temperature, and vice versa.

The amount of alkali metal or alkaline earth metal ions per epoxy group is preferably greater than 0.00001 and more preferably is 0.00005 to 0.3, based in each case on the number of alkali metal or alkaline earth metal ions and epoxy groups.

As polyols (d) it is possible for the purposes of the this invention to use compounds having at least two isocyanate-reactive groups and having a molecular weight of at least 350, preferably at least 400 g/mol, and more preferably at least 500 g/mol. Isocyanate-reactive groups present may be groups such as OH-, SH-, NH-, and CH-acid groups. The polyols preferably have essentially OH groups, more preferably exclusively OH groups, as isocyanate-reactive groups. In one preferred embodiment the polyols have at least 40%, preferably at least 60%, more preferably at least 80%, and more particularly at least 95% of secondary OH groups, based on the number of isocyanate-reactive groups.

As polyols (d) it is possible for example to use polyethers, polycarbonate polyols or polyesters that are known in polyurethane chemistry. The polyols preferably employed are polyetherols and/or polyesterols having number-average molecular weights of between 350 and 12 000, preferably 400 to 6000, more particularly 500 to less than 3000, and having preferably an average, nomional functionality of 2 to 6, preferably of 2 to 3. The number-average molecular weights here are obtained customarily via determination of the OH number according to DIN 53240 and subsequent calculation according to the formula Mn=Fn*1000*56.1/OH number, with the functionality used being the nominal functionality.

The use of polyol (d) is optional. Preference is given to using polyol (d). In that case the fraction of polyol (d), based on the total weight of components (c), (d), and (e), is preferably from 10 to 90 wt %, more preferably from 40 to 85 wt %, and more particularly from 60 to 80 wt %.

Commonly used are polyetherols and/or polyesterols having 2 to 8 isocyanate-reactive hydrogen atoms. The OH number of these compounds is situated customarily in the range from 30 to 850 mg KOH/g, preferably in the region of 50 and 600 mg KOH/g.

The polyetherols are obtained by known methods, as for example by anionic polymerization of alkylene oxides with addition of at least one starter molecule that contains 2 to 8, preferably 2 to 6, and more preferably 2 to 4 reactive hydrogen atoms in bonded form, in the presence of catalysts. Catalysts used may be alkali metal hydroxides, such as sodium or potassium hydroxide, or alkali metal alkoxides, such as sodium methoxide, sodium or potassium ethoxide or potassium isopropoxide, or, in the case of cationic polymerization, Lewis acids, such as antimony pentachloride, boron trifluoride etherate or bleaching may be used as catalysts. As catalysts it is possible additionally to use double metal cyanide compounds as well, referred to as DMC catalysts. For polyetherols with hydroxy numbers>200 mg KOH/g, the catalyst used may also be a tertiary amine, such as imidazole, for example. Such polyols are described in WO 2011/107367, for example.

As alkylene oxides, preference is given to using one or more compounds having 2 to 4 carbon atoms in the alkylene radical, such as tetrahydrofuran, 1,2-propylene oxide, or 1,2- and/or 2,3-butylene oxide, in each case alone or in the form of mixtures, and preferably 1,2-propylene oxide, 1,2-butylene oxide and/or 2,3-butylene oxide, more particularly 1,2-propylene oxide.

Examples of starter molecules contemplated include ethylene glycol, diethylene glycol, glycerol, trimethylolpropane, pentaerythritol, sugar derivatives, such as sucrose, hexitol derivatives, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine, and also other di- or polyhydric alcohols or mono- or polyfunctional amines.

The polyester alcohols used are prepared usually by condensation of polyfunctional alcohols having 1 to 12 carbon atoms, such as ethylene glycol, diethylene glycol, butanediol, trimethylolpropane, glycerol or pentaerythritol, with polyfunctional carboxylic acids having 2 to 12 carbon atoms, examples being succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomers of naphthalinedicarboxylic acids, or the anhydrides thereof.

As further starting materials in the preparation of the polyesters it is possible to use hydrophobic substances. The hydrophobic substances are water-insoluble substances which comprise an apolar organic radical and also possess at least one reactive group, selected from hydroxyl, carboxylic acid, carboxylic ester or mixtures thereof. The equivalent weight of the hydrophobic materials is preferably between 130 and 1000 g/mol. Use may be made, for example, of fatty acids, such as stearic acid, oleic acid, palmitic acid, lauric acid or linoleic acid, and also fats and oils, such as, for example, castor oil, corn oil, sunflower oil, soybean oil, coconut oil, olive oil or tall oil, for example. Where polyesters comprise hydrophobic substances, the fraction of the hydrophobic substances among the total monomer content of the polyester alcohol is preferably 1 to 30 mol %, more preferably 4 to 15 mol %.

The polyesterols used preferably have a functionality of 1.5 to 5, more preferably 1.8-3.5.

For the preparation of particularly hydrophobic reaction mixtures, as for example if the intention is to prevent water being condensed in during the long open time, or if the polyurethane of the invention is to be particularly stable toward hydrolysis, the polyol used may also comprise a hydroxyl-functionalized hydrophobic compound, such as a hydroxyl-functionalized compound from fat chemistry.

A series of hydroxyl-functional compounds from fat chemistry are known that can be used. Examples are castor oil, hydroxyl-modified oils such as grape seed oil, black coumene oil, pumpkin seed oil, borage seed oil, soybean oil, wheat germ oil, rapeseed oil, sunflower oil, peanut oil, apricot kernel oil, pistachio kernel oil, almond oil, olive oil, macadamia nut oil, avocado oil, sea buckthorn oil, sesame oil, hazelnut oil, evening primrose oil, wild rose oil, hemp oil, thistle oil, walnut oil, hydroxyl-modified fatty acid esters based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid, cervonic acid. Preference is given here to using castor oil and its products of reaction with alkylene oxides or ketone-formaldehyde resins. Latter compounds are sold for example by Bayer AG under the Desmophen® 1150 designation.

A further group of fatty-chemical polyols used with preference may be obtained through ring opening of epoxidized fatty acid esters with simultaneous reaction of alcohols and, optionally, further transesterification reactions subsequently. The incorporation of hydroxyl groups into oils and fats is accomplished primarily by epoxidation of the olefinic double bond present in these products, followed by the reaction of resultant epoxide groups with the mono- or polyhydric alcohol. This produces, from the epoxide ring, a hydroxyl group or, in the case of polyfunctional alcohols, a structure having a higher number of OH groups. Since oils and fats are usually glycerol esters, parallel transesterification reactions run additionally during the reactions stated above. The compounds thus obtained preferably have a molecular weight in the range from between 500 and 1500 g/mol. Products of this kind are available for example from BASF under the product designation Sovermole®.

One particularly preferred embodiment of the invention uses castor oil as polyol (d), more preferably exclusively castor oil.

Polyetherol/polyesterol hybrid polyols as well, as described under WO 2013/127647 and WO 2013/110512, can be used as polyols.

In order to modify the mechanical properties, such as the hardness, the addition of chain extenders, crosslinking agents or else, optionally, mixtures thereof may prove advantageous. In the preparation of a composite of the invention it is possible to use a chain extender (e). At the same time, however, it is also possible to do without the chain extender (e).

Where low molecular weight chain extenders and/or crosslinking agents (e) are used, it is possible to use chain extenders that are known in the context of polyurethane production. These are preferably low molecular weight compounds having at least two isocyanate-reactive groups and used for molecular weights of less than 500 g/mol, more preferably of 60 to less than 400 g/mol, and more particularly 60 to less than 350 g/mol. Examples of those content rates will include aliphatic, cycloaliphatic and/or araliphatic or aromatic diols having 2 to 14, preferably 2 to 10 carbon atoms, such as ethylene glycol, 1,3-propanediol, 1,4-butanediol, 1,6-hexanediol, 1,10-decanediol and bis(2-hydroxyethyl)hydroquinone, 1.2-, 1,3-, 1,4-dihydroxycyclohexane, diethylene glycol, dipropylene glycol, tripropylene glycol, triols, such as 1,2,4-, 1,3,5-trihydroxycyclohexane, glycerol and trimethylolpropane, and hydroxyl-containing polyalkylene oxides of low molecular weight that are based on ethylene oxide and/or on 1,2-propylene oxide and on the aforementioned diols and/or triols as starter molecules. Further possible low molecular weight chain extenders and/or crosslinking agents are specified for example in "Kunststoffhandbuch, volume 7, Polyurethane", Carl Hanser Verlag, 3rd edition 1993, sections 3.2 and 3.3.2. With preference no chain extender is used.

As fillers and further additives (f) it is possible to use customary fillers, and other adjuvants, such as additives for water adsorption, flame retardants, hydrolysis inhibitors, antioxidants, and internal release agents. Such substances are stated for example in "Kunststoffhandbuch, volume 7, Polyurethane", Carl Hanser Verlag, 3rd edition 1993, sections 3.4.4 and 3.4.6 to 3.4.11.

Fillers, especially fillers with reinforcing activity, are the customary organic and inorganic fillers, reinforcing agents, etc., that are known per se. Individual examples include: inorganic fillers such as silicatic minerals, examples being finely ground quartzes, phyllosilicates, such as antigorite, serpentine, homblendes, amphibols, chrysotile, and talc; metal oxides, such as kaolin, aluminum oxides, titanium oxides and iron oxides, metal salts such as chalk, heavy spar and inorganic pigments, such as cadmium sulfide, zinc sulfide, and also glass and others. Preference is given to using kaolin (china clay), finely ground quartzes, aluminum silicate, and coprecipitates of barium sulfate and aluminum silicate, and also natural and synthetic minerals in fiber form such as wollastonite, metal fibers and glass fibers of various lengths, which may optionally have been sized. Examples of organic fillers contemplated include: charcoal, melamine, resin, cyclopentadienyl resins, and graft polymers, and also cellulose fibers, polyamide, polyacrylonitrile, polyurethane, and polyester fibers based on aromatic and/or aliphatic dicarboxylic esters, and especially carbon fibers.

Preferred for use as fillers are those having an average particle diameter of 0.1 to 500, more preferably from 1 to 100 and more particularly from 1 to 10 µm. Diameter in this context, in the case of nonspherical particles, refers to their extent along the shortest axis in space. In the case of nonspherical particles, fibers for example, such as glass fibers, the extent along their longest axis in space is preferably less than 500 µm, more preferably less than 300 µm. Preferred for use as fillers are glass fibers or finely ground quartzes. Also possible, furthermore, is the use of crosslinked fillers, examples being woven fabric mats, such as glass fiber mats, carbon fiber mats or natural fiber mats as fillers. These fillers are identified as reinforcing agents in the context of the invention.

The inorganic and organic fillers may be used individually or as mixtures and are incorporated into the reaction mixture advantageously in amounts of 0.5 to 30 wt %, preferably 1 to 20 wt %, based on the weight of components (a) to (e).

Additives for water adsorption used are preferably aluminosilicates, selected from the group of sodium aluminasilicates, potassium aluminasilicates, calcium aluminasilicates, cesium aluminasilicates, barium aluminasilicates, magnesium aluminasilicates strontium aluminasilicates, sodium aluminophosphates, potassium aluminophosphates, calcium aluminophosphates, and mixtures thereof. Particularly preferred are mixtures of sodium, potassium, and calcium aluminasilicates, used in castor oil as carrier substance.

The additive for water absorption preferably has an average particle size of not greater than 200 µm, more preferably not greater than 150 µm, and more particularly not greater than 100 µm. The pore size of the additive of the invention for water absorption is preferably 2 to 5 Angstroms. As well as the inorganic additives for water adsorption, it is also possible to use known organic additives for water adsorption, such as orthoformates, triisopropylorthoformate for example.

If an additive for water absorption is added, it is added preferably in amounts greater than one part by weight, more preferably in the range from 1.2 to 2 parts by weight, based on the total weight of the polyisocyanurate system.

Polyurethane foams are to be produced, but instead of water scavengers it is also possible to use chemical and/or physical blowing agents that are customary in polyurethane chemistry. Chemical blowing agents are understood to be compounds which react with isocyanate to form gaseous products, such as water or formic acid, for example. Physical blowing agents are understood as compounds which are present in solution or emulsion in the polyurethane production ingredients and which vaporize under the conditions of polyurethane formation. These are, for example, hydrocarbons, halogenated hydrocarbons, and other compounds, such as perfluorinated alkanes, for example, such as perfluorohexane, hydrofluorochlorocarbons, and ethers, esters, ketones, acetals or mixtures thereof, examples being cyclo) aliphatic hydrocarbons having 4 to 8 carbon atoms, or hydrofluorocarbons, such as Solkane® 365 mfc from Solvay Fluorides LLC. Preferably no blowing agent is added.

As flame retardants it is possible in general to use the flame retardants known from the prior art. Examples of suitable flame retardants are brominated ethers (Ixol B 251), brominated alcohols, such as dibromoneopentyl alcohol, tribromoneopentyl alcohol and PHT-4-diol, and also chlorinated phosphates, such as, for example, tris(2-chloroethyl) phosphate, tris(2-chloroisopropyl) phosphate (TCPP), tris(1, 3-dichloroisopropyl) phosphate, tris(2,3-dibromopropyl) phosphate and tetrakis(2-chloroethyl) ethylene diphosphate, or mixtures thereof.

Apart from the halogen-substituted phosphates already stated, use may be made of inorganic flame retardants, such as red phosphorus, preparations comprising red phosphorus, expandable graphite, aluminum oxide hydrate, antimony trioxide, arsenic oxide, ammonium polyphosphate and calcium sulfate, or cyanuric acid derivatives, such as melamine, or mixtures of at least two flame retardants, such as ammonium polyphosphates and melamine, and also, optionally, starch, or rendering the rigid polyurethane foams, produced in accordance with the invention, flame retardant.

As further liquid, halogen-free flame retardants it is possible to use diethyl ethanephosphonate (DEEP), triethyl phosphate (TEP), dimethyl propylphosphonate (DMPP), diphenyl cresyl phosphate (DPC), and others.

The flame retardants are used for the purposes of the present invention preferably in an amount of 0 to 60 wt %, more preferably of 5 to 50 wt %, more particularly of 5 to 40 wt %, based on the total weight of components (b) to (e).

As internal release agents it is possible to use all release agents customary in polyurethane production, examples being metal salts, such as zinc stearate, in diamine solution, and derivatives of polyisobutylene succinic acid.

A polyurethane system of the invention preferably has less than 0.5 wt %, more preferably less than 0.3 wt %, of water, based on the total weight of components (b) to (e).

The polyurethanes of the invention are prepared by mixing components (a) to (c) and optionally (d) to (f) to give a reaction mixture and carrying out full reaction of the reaction mixture to give a polyurethane. For the purposes of the invention the mixture of components (a) to (f) is referred to as reaction mixture at conversions of less than 90%, based on the isocyanate groups.

Individual components may already have been premixed. Thus, for example, polyisocyanates (a) and the mixture obtainable by introducing an alkali metal or alkaline earth metal salt into a compound (b) comprising urethane groups may be premixed, provided component (b) has no isocyanate-reactive groups. Similarly, components (c), (d), (e), and (f) may be premixed. Should component (b) contain no isocyanate groups, component (b) as well may be added to this mixture.

Reaction mixtures of the invention have a long open time at 25° C., of more than 60 minutes for example, preferably of more than 90 minutes, and more preferably of more than 120 minutes. This open time is determined as described above via the increase in viscosity. On temperature increase to temperatures greater than 70° C., preferably greater than 80 to 200° C., and more preferably to 90 to 150° C., the reaction mixture of the invention cures rapidly, in less than 50 minutes for example, preferably in less than 30 minutes, more preferably in less than 10 minutes, and more particularly in less than 5 minutes. For the purposes of the invention the curing of a reaction mixture of the invention is understood as the increase in the initial viscosity to 10 times the initial viscosity. The difference here between the open time at 25° C. and the open time at 130° C. is preferably at least 40 minutes, more preferably at least one hour, and very preferably at least 2 hours.

The isocyanate index for a method of the invention may be varied within wide ranges, from 40 to 10 000 for example, preferably from 50 to 10 000. Particularly for relatively soft products, for example, the index may be in the range from 90 to 400, preferably 95 to 300, and in particular for those of the hard products it is above 400, such as 401 to 2000, more preferably 450 to 1500, and more particularly 450 to 1000. In this way the materials properties can be influenced. The isocyanate index for the purposes of the present invention is the stoichiometric ratio of isocyanate groups for isocyanate-reactive groups, multiplied by 100. Isocyanate-reactive groups are all isocyanate-reactive groups present in the reaction mixture, including those of chemical blowing agents and compounds having epoxide groups, but not the isocyanate group itself.

With the process of the invention, preferably, a compact material is obtained, meaning that no blowing agent is added. Small amounts of blowing agent, as for example small amounts of water, which pass by condensation into the reaction mixture or the starting components in the course of processing, by way of atmospheric moisture, are not included here. A compact polyurethane is a polyurethane which is substantially free from gas inclusions. The density of a compact polyurethane is preferably greater than 0.8 g/cm$^3$, more preferably greater than 0.9 g/cm$^3$ and, more particular greater than 1.0 g/cm$^3$.

The polyurethanes of the invention can be used for all types of polyurethane in whose preparation a long open time and rapid curing of the reaction mixture are advantageous. Selected here is an isocyanate index of greater than 150, more preferably of greater than 400, when the resulting polyurethanes are to have particular temperature stability and flame retardancy. The polyurethanes of the invention have a particularly high glass transition temperature. Transparent polyurethanes can also be produced. The process of the invention is used preferably for producing fiber composite components. For this purpose, customary fibers, such as glass fibers or carbon fibers, more particularly fiber mats, are wetted with the reaction mixture. The reaction mixture of the invention can also be used to produce honeycomb composite materials, such as door elements in automobile construction. The reaction mixture can additionally be employed in vacuum infusion processes for producing structural sandwich components, such as exterior automotive paneling or vanes for wind energy installations.

Examples of the further uses include pultrusion, fiber winding techniques, and all applications where a long open time and rapid curing of the polymeric component are advantageous. These articles can be produced by customary methods in customary molds, preferably heatable molds.

With preference, apart from the alkali metal or alkaline earth metal salt used in component (b), there are no compounds used in the process of the invention that accelerate the isocyanate-polyol reaction, and in particular none of the customary polyurethane catalysts based on compounds having tertiary amine groups are used. The polyurethanes of the invention are notable for outstanding mechanical properties, which can be varied within wide limits.

A further subject of the present invention is the polyurethane obtainable by a process of the invention, and the use of a polyurethane of the invention for producing a multiplicity of composite materials, as for example in resin transfer molding (RTM), resin injection molding (RIM) or structural reaction injection molding (SRIM), in order to produce, for example, bodywork components for vehicles, door or window frames, or honeycomb-reinforced components; in vacuum assisted resin infusion in order, for example, to produce structural components of vehicles or wind power installations; in filament winding in order, for example, to produce pressure-stable containers or tanks; in rotational casting in order to produce, for example, pipes and pipe coatings; and in pultrusion, in order, for example, to produce door and window profiles, fiber-reinforced components for vehicles, wind power installations, antennas or leads, and reinforcing rods for concrete. The polyurethane of the invention may further be used for producing prepregs for, for example, sheet molding compounding (SMC) or bulk molding compound (BMC). The composites with the polyurethane produced in accordance with the invention may further be employed for example for high-piece-rate production of parts for vehicles, components for trains, air and space travel, marine applications, wind power installations, structural components, adhesives, packaging, encapsulation materials, and insulators. The polyurethane of the invention can also be used without fiber reinforcement as pure casting material, as for example as adhesive or coating for pipe coatings, for example. The polyurethane produced by a process of the invention is used preferably for producing bodywork components for vehicles, such as bumpers, fenders or roof parts.

The present invention is illustrated below with reference to examples:
Starting Materials:
Polyol 1 castor oil
Polyol 2 glycerol-started polypropylene oxide, functionality=3, OHN=400 mg KOH/g
Polyol 3 polyester based on adipic acid, functionality=2, OHN=56 mg KOH/g
GDE 1 trimethylolpropane triglycidyl ether
GDE 2 bisphenol A-based diglycidyl ether, e.g. Araldite GY 250 from Huntsman
ZM1 triisopropyl orthoformate
ZM 2 reaction product consisting of ethanol and Iso 1
ZM3 reaction product consisting of Iso 1 with a monofunctional polyethylene oxide having a number-average molecular weight of 500 g/mol, obtainable under the trade name "Pluriol® A 500 E" from BASF
Kat 1 mixture of LiCl and ZM3, 0.50 eq. LiCl based on number of urethane bonds in ZM 3
Kat 2 mixture of LiBr and ZM 2, 0.65 eq. LiBr based on number of urethane bonds in ZM2
Kat 3 mixture of $MgCl_2$ and ZM 2, 0.65 eq. $MgCl_2$ based on number of urethane bonds in ZM2
Kat 4 LiCl saturated in solution in ethanol concentration arithmetically 0.67 mol/L according to Knovel Critical Tables (2nd Edition)
Kat 5 noninventive mixture of LiCl and urea prepolymer, obtainable by reaction of Jeffamin M600 and Iso 1 and also 0.50 eq. LiCl, based on the number of urea bonds in the prepolymer as described accordingly in WO10121898.
Iso 1 carbodiimide-modified 4,4'-diphenylmethane diisocyanate (MDI), e.g. "Lupranat MM 103" from BASF, NCO content 29.5%
Iso 2 diphenylmethane diisocyanate (MDI) with more highly polycyclic homologs, e.g. "Lupranat® M20" from BASF, NCO content 31.5%
Iso 3 prepolymer obtainable by reacting diphenylmethane diisocyanate, more highly polycyclic homologs of diphenylmethane diisocyanate, and a polyetherol, functionality 2.4, NCO content 28.5% (Lupranat® MP 105 from BASF)

Preparation of ZM 2 and 3: The monool was charged to a glass flask and the isocyanate was added with vigorous stirring with a magnetic stirrer. Throughout the synthesis the temperature was monitored by a temperature sensor. Heating then took place to 70° C. until the reaction started. If the reaction heated up itself, an ice bath was used for cooling; if the reaction was fairly sluggish, the temperature was raised further to 90° C. and stirring was continued for 30 minutes. After the end of the reaction, the reaction mixture was cooled to room temperature. Depending on the molecular weight of the monool used, the product was a solid or a viscous oil.

Preparation of Kat 1-3: The respective ZM 2 or 3 was mixed with the corresponding amount of LiCl in solution in ethanol, and this mixture was heated to 70° C. and stirred at that temperature for 30 minutes. The reaction mixture was subsequently cooled and excess ethanol was stripped off in a rotary evaporator. Depending on the molecular weight of the ZM used, the product was a solid or a viscous oil.

In accordance with table 1, the specified components 1 and 2 in the specified weight ratios were mixed at room temperature in a Speedmixer at 1950 rpm for 1 minute. Then the total mixture with index 700 was mixed from components 1 and 2 at room temperature, and stirred in a Speedmixer at 1950 rpm for 1 minute. After that the gel time was determined using the Shyodu Gel timer, type 100, version 2012 at 25° C. and at 130° C.

TABLE 1

| Component 1 | | | | Component 2 | | | | Open time | |
|---|---|---|---|---|---|---|---|---|---|
| Polyol 1 | GDE 1 | Kat 1 | Iso 1 | Iso 1 | Kat 1 | GDE 1 | Index | RT | 130° C. |
| 16.31 | 3.84 | — | — | 79.45 | 0.4 | — | 700 | several hours | <10 min |
| 16.31 | — | — | — | 79.45 | 0.4 | 3.84 | 700 | several hours | <10 min |
| 16.31 | — | — | — | 79.45 | 0.4 | 3.84 | 700 | several hours | <10 min |
| 16.31 | 3.84 | — | — | 79.45 | 0.4 | — | 700 | several hours | <10 min |
| 16.31 | — | 0.4 | — | 79.45 | — | 3.84 | 700 | several hours | <10 min |

TABLE 1-continued

| Component 1 | | | | Component 2 | | | | Open time | |
|---|---|---|---|---|---|---|---|---|---|
| Polyol 1 | GDE 1 | Kat 1 | Iso 1 | Iso 1 | Kat 1 | GDE 1 | Index | RT | 130° C. |
| 16.31 | — | — | 79.45 | — | 0.4 | 3.84 | 700 | several hours | <10 min |
| 16.31 | — | 0.4 | — | 79.45 | — | 3.84 | 700 | several hours | <10 min |
| 16.31 | — | — | 79.45 | — | 0.4 | 3.84 | 700 | several hours | <10 min |
| 16.31 | 3.84 | 0.4 | — | 79.45 | — | — | 700 | several hours | <10 min |
| 16.31 | — | 0.4 | 79.45 | — | — | 3.84 | 700 | several hours | <10 min |
| 16.31 | 3.84 | 0.4 | — | 79.45 | — | — | 700 | several hours | <10 min |
| 16.31 | — | 0.4 | 79.45 | — | — | 3.84 | 700 | several hours | <10 min |
| 16.31 | 3.84 | 0.4 | 79.45 | — | — | — | 700 | several hours | <10 min |
| 16.31 | 3.84 | — | 79.45 | — | 0.4 | — | 700 | several hours | <10 min |
| 16.31 | 3.84 | 0.4 | 79.45 | — | — | — | 700 | several hours | <10 min |

Table 1 shows that the mixing sequence of the addition of the mixture (b) of the invention, obtainable by introducing alkali metal or alkaline earth metal salt into a compound comprising urethane groups, can take place both in component 1 and in component 2 without influencing the latent reaction.

According to table 2, the stated components were mixed at room temperature in the stated weight ratios in a Speedmixer at 1950 rpm for 1 minute. The gel time was then determined using a Shyodu gel timer, type 100, version 2012. Unless otherwise indicated, the data refer to parts by weight. The "open time difference" indicates the time of the difference between the open times at room temperature and at 130° C.

TABLE 2

| | Comparative 1 | Comparative 2 | Comparative 3 | Comparative 4 | Comparative 5 | Example 1 | Example 2 | Example 3 |
|---|---|---|---|---|---|---|---|---|
| Polyol 1 | 77.0 | 77.0 | 77.0 | 100.0 | 77.0 | 77.0 | 77.0 | 77.0 |
| Polyol 2 | | | | | | | | |
| Polyol 3 | | | | | | | | |
| GDE 1 | 20.0 | 20.0 | 20.0 | | 20.0 | 20.0 | 20.0 | 20.0 |
| GDE 2 | | | | | | | | |
| ZM1 | 3.0 | 3.0 | 3.0 | | 3.0 | 3.0 | 3.0 | 3.0 |
| Kat 1 | | | | | | 0.5 | | |
| Σ A comp. | 100.0 | 100.0 | 100.0 | 100.0 | 100.0 | 100.5 | 100.0 | 100.0 |
| ZM 2 | | 5.0 | | | | | | |
| Kat 1 | | | | | 0.5 | | 0.5 | 0.5 |
| Kat 2 | | | | | | | | |
| Kat 3 | | | | | | | | |
| Kat 4 | | | | 2.3 | | | | |
| Kat 5 | | | | | 0.5 | | | |
| Iso 1 | | 95.0 | 97.7 | 99.5 | 99.5 | 100.0 | 99.5 | 99.5 |
| Iso 2 | | | | | | | | |
| Iso 3 | 100.0 | | | | | | | |
| Σ B comp. | 100.0 | 100.0 | 100.0 | 100.0 | 100.0 | 100.0 | 100.0 | 100.0 |
| Index | 420 | 410 | 420 | 500 | 500 | 40 | 100 | 500 |
| Mixing ratio | 100:245 | 100:243 | 100:242 | 100:515 | 100:327 | 100:24 | 100:57 | 100:283 |
| Open time (RT) | hardly any reaction, viscosity increase over hours | hardly any reaction, viscosity increase over hours | 1 min | hardly any reaction, viscosity increase over hours | more than 1 week | more than 1 week | several hours | more than 1 week |
| Open time (130° C.) | hardly any reaction, viscosity increase over hours | hardly any reaction, viscosity increase over hours | 1 min | hardly any reaction, viscosity increase over hours | 20 min | 10 min | 3 min | 6 min |
| Open time difference | not measurable | not measurable | not measurable | not measurable | more than 1 week | more than 1 week | several hours | more than 1 week |

TABLE 2-continued

|  | Example 4 | Example 5 | Example 6 | Example 7 | Example 8 | Example 9 | Example 10 | Example 11 |
|---|---|---|---|---|---|---|---|---|
| Polyol 1 | 77.0 | 77.0 | 77.0 | 77.0 |  | 77.0 |  |  |
| Polyol 2 |  |  |  |  | 79.0 |  |  |  |
| Polyol 3 |  |  |  |  |  |  | 77.0 |  |
| GDE 1 | 20.0 | 20.0 | 20.0 | 20.0 | 21.0 |  | 20.0 | 100.0 |
| GDE 2 |  |  |  |  |  | 20.0 |  |  |
| ZM1 | 3.0 | 3.0 | 3.0 | 3.0 |  | 3.0 | 3.0 |  |
| Σ A comp. | 100.0 | 100.0 | 100.0 | 100.0 | 100.0 | 100.0 | 100.0 | 100.0 |
| ZM 2 |  |  |  |  |  |  |  |  |
| Kat 1 | 0.5 |  |  |  | 0.5 | 0.5 | 0.5 | 0.5 |
| Kat 2 |  |  | 5.0 |  |  |  |  |  |
| Kat 3 |  |  |  | 5.0 |  |  |  |  |
| Kat 4 |  | 0.5 |  |  |  |  |  |  |
| Iso 1 | 99.5 |  | 95.0 | 95.0 | 99.5 | 99.5 | 99.5 | 99.5 |
| Iso 2 |  |  |  |  |  |  |  |  |
| Iso 3 |  | 99.5 |  |  |  |  |  |  |
| Σ B comp. | 100.0 | 100.0 | 100.0 | 100.0 | 100.0 | 100.0 | 100.0 | 100.0 |
| Index | 1700 | 410 | 410 | 410 | 500 | 500 | 700 | 500 |
| Mixing ratio | 100:962 | 100:293 | 100:307 | 100:307 | 100:312 | 100:265 | 100:263 | 100:1102 |
| Open time (RT) | more than 1 week | 20 min | several hours | several hours | several hours | several hours | several hours | several hours |
| Open time (130° C.) | 10 min | 2 min | 10 min | 40 min | 10 min | 10 min | 10 min | 10 min |
| Open time difference | more than 1 week | 18 min | several hours | several hours | several hours | several hours | several hours | several hours |

Table 2 shows that without addition of a mixture (b) of the invention, obtainable by introducing an alkali metal or alkaline earth metal salt into a compound comprising urethane groups, there is no reaction, or no delayed reaction, observable at room temperature. Without addition of catalyst the reaction does not start (comparative experiments 1 and 2). With addition of lithium chloride, the open time both at room temperature and at 130° C. is about one minute (comparative 3); there is no delayed reaction. Without glycidyl ether, there is likewise no sufficient reaction observable (comparative 4). If a structure is used whose behavior is bidentate relative to the cation or anion originating from the salt, an example of such a structure being urea (—NH—CO—NH—), such as the noninventive kat 5 from WO10121898, systems are obtained which have a long open time RT and comparatively slow curing at 130° C. (comparative experiments 5 (you've taken out 6 again) in comparison to example 3 (example 3 is for comparison; both have an index of 500)). Examples 1 to 11 demonstrate that for different isocyanate indices and different compounds with isocyanate groups, and different alkali metal or alkaline earth metal salt, long open times are obtained at room temperature, while rapid curing is achieved at 130° C. Here, the presence of sufficient urethane groups to form an epoxy compound is likewise essential (example 5).

Table 3a describes mixtures produced by means of the mixture (b) of the invention in different indices. Table 3b describes various further mixtures in which not only the index but also further mixing ratios of the components were varied.

For this purpose, the stated components were mixed at room temperature in the stated proportions in a Speedmixer at 1950 rpm for 1 minute. The mixture was then introduced into an aluminum mold, open at the top and with dimensions of 30×20×0.2 cm, and was reacted in an oven at 130° C. The physical characteristics in table 3a and b were determined in accordance with the standards reported in tables 3.

TABLE 3a

|  |  | Example 11 | Example 12 | Example 1 [Tab 1] | Example 13 | Example 14 | Example 2 [Tab 2] |
|---|---|---|---|---|---|---|---|
| Polyol 1 |  | 77 | 77 | 77 | 77 | 77 | 77 |
| GDE1 |  | 20 | 20 | 20 | 20 | 20 | 20 |
| ZM1 |  | 3 | 3 | 3 | 3 | 3 | 3 |
| Σ A comp. |  | 100 | 100 | 100 | 100 | 100 | 100 |
| Iso 1 |  | 99.5 | 99.5 | 99.5 | 99.5 | 99.5 | 99.5 |
| Kat 1 |  | 0.5 | 0.5 | 0.5 | 0.5 | 0.5 | 0.5 |
| Σ B comp. |  | 100 | 100 | 100 | 100 | 100 | 100 |
| Index |  | 50 | 90 | 100 | 150 | 250 | 500 |
| Mixing ratios |  | 100:28 | 100:51 | 100:57 | 100:85 | 100:142 | 100:283 |
| Hardness | DIN 53505 | 26 A | 52 A | 67 A | 82 A | 77 D | 87 D |
| Tensile strength [MPa] | DIN EN ISO 527 | not measurable | 8.6 | 16.3 | 26.7 | 61.7 | not measurable |

TABLE 3a-continued

|  |  | Example 11 | Example 12 | Example 1 [Tab 1] | Example 13 | Example 14 | Example 2 [Tab 2] |
|---|---|---|---|---|---|---|---|
| Elongation at break [%] | DIN EN ISO 527 | not measurable | 104 | 85 | 53 | 9 | not measurable |
| Modulus of elasticity [MPa] | DIN EN ISO 527 | not measurable | 20 | 13.9 | 267 | 1158 | not measurable |
| Tear resistance [N/mm] | DIN ISO 34-1b B(b) | 2.1 | 6.6 | 24.4 | 51.2 | 19.2 | not measurable |

TABLE 3b

|  |  | Example 15 | Example 16 | Example 17 | Example 18 | Example 19 |
|---|---|---|---|---|---|---|
| Polyol 1 |  | 79 | 79 | 79 | 79 | 79 |
| GDE1 |  | 21 | 21 | 21 | 21 | 21 |
| ZM1 |  | 0 | 0 | 0 | 0 | 0 |
| Σ A comp. |  | 100 | 100 | 100 | 100 | 100 |
| Iso 1 |  | 95 | 95 | 95 | 95 | 95 |
| Iso 2 |  | 0 | 0 | 0 | 0 | 0 |
| Kat 1 |  | 5 | 5 | 5 | 5 | 5 |
| Σ B comp. |  | 100 | 100 | 100 | 100 | 100 |
| Index |  | 50 | 90 | 100 | 150 | 250 |
| Mixing ratio |  | 100:34 | 100:59 | 100:65 | 100:98 | 100:164 |
| Hardness | DIN 53505 | 22A | 86D/35A | 92D/44A | 72 D | 75 D |
| Tensile strength [MPa] | DIN EN ISO 527 | n.m. | 11.2 | 12.7 | 39 | 42 |
| Elongation at break [%] | DIN EN ISO 527 | n.m. | 80 | 55 | 8 | 3 |
| Modulus of elasticity [MPa] | DIN EN ISO 527 | n.m. | 24.9 | 34.8 | 1085.4 | 1440.5 |
| Tear resistance [N/mm] | DIN ISO 34-1b B(b) | 1.3 | 26.8 | 36.6 | 43.2 | 18.8 |

|  | Example 20 | Example 21 | Example 22 | Example 23 | Example 24 | Example 25 | Example 26 |
|---|---|---|---|---|---|---|---|
| Polyol 1 | 77 | 77 | 77 | 77 | 77 | 77 | 77 |
| GDE1 | 20 | 20 | 20 | 20 | 20 | 20 | 20 |
| ZM1 | 3 | 3 | 3 | 3 | 3 | 3 | 3 |
| Σ A comp. | 100 | 100 | 100 | 100 | 100 | 100 | 100 |
| Iso 1 | 0 | 0 | 0 | 0 | 0 | 0 | 0 |
| Iso 2 | 99.5 | 99.5 | 99.5 | 99.5 | 99.5 | 99.5 | 99.5 |
| Kat 1 | 0.5 | 0.5 | 0.5 | 0.5 | 0.5 | 0.5 | 0.5 |
| Σ B comp. | 100 | 100 | 100 | 100 | 100 | 100 | 100 |
| Index | 260 | 365 | 470 | 575 | 680 | 1500 | 1700 |
| Mixing ratio | 100:178 | 100:248 | 100:319 | 100:390 | 100:461 | 100:1018 | 100:1154 |
| Hardness | 78 D | 81 D | 82 D | 85 D | 85 D | 85 D | 85 D |
| Tensile strength [MPa] | 43.3 | 56.5 | 69.9 | 76.4 | 80.7 | 6.7 | 7.1 |
| Elongation at break [%] | 7 | 7 | 5 | 5 | 5 | 0 | 0 |
| Modulus of elasticity [MPa] | 1535 | 2027 | 2664 | 2997 | 3139 | 2417 | 2619.7 |
| Tear resistance [N/mm] | not measurable | not measurable | not measurable | not measurable | not measurable | not measurable | not measurable |

The invention claimed is:

1. A process for preparing a polyurethane, comprising: mixing
   a) a first polyisocyanate,
   b) a compound (b) obtained by mixing at least one of an alkali metal salt and an alkaline earth metal salt with a urethane group-comprising compound, which is present in solid or liquid form at 20° C. and wherein the urethane group-comprising compound does not contain a —NH—CO—NH—group,
   c) a compound comprising at least one epoxide group,
   optionally d) a polyol,
   optionally e) a chain extender,
   optionally f) a filler, and
   optionally a further additive,
   to form a reaction mixture; and
   reacting the reaction mixture, to obtain the polyurethane, wherein an amount of alkali metal ions or alkaline earth metal ions per urethane group in the compound (b) is 0.0001 to 3.5, based on the number of alkali metal or alkaline earth metal ions and urethane groups, and wherein the compound (b) contains exclusively monodentate urethane groups in relation to the salt anion and/or salt cation of the alkali metal salt and/or the alkaline earth metal salt.

2. The process according to claim 1, wherein the urethane group-comprising compound used to obtain the compound (b) is obtained by reacting a second polyisocyanate and alcohols.

3. The process according to claim 1, wherein the urethane group-comprising compound used to obtain the compound (b) is a reaction product of a second polyisocyanate and a compound having an OH group.

4. The process according to claim 1, wherein the urethane group-comprising compound used to obtain the compound (b) is a reaction product of a second polyisocyanate and a compound having at least two OH groups, the second isocyanate present in a stoichiometric excess.

5. The process according to claim 2, wherein the second polyisocyanate comprises at least one isomer or homolog of diphenylmethane.

6. The process according to claim 2, wherein the first polyisocyanate (a) and the second polyisocyanate are identical.

7. The process according to claim 1, wherein an amount of alkali metal ions or alkaline earth metal ions per isocyanate group in the first polyisocyanate (a) and in the compound (b) is 0.0001 to 0.3, based on the number of alkali metal ions or alkaline earth metal ions and urethane groups.

8. The process according to claim 1, wherein the compound comprising at least one epoxide group (c) comprises two, three or more epoxide groups per molecule.

9. The process according to claim 1, wherein the alkali metal salt or the alkaline earth metal salt is lithium chloride.

10. The process according to claim 1, wherein the compound (b) is obtained by mixing a polyisocyanate, a compound with an isocyanate-reactive compound, and the alkali metal salt or the alkaline earth metal salt.

11. The process according to claim 1, wherein the compound comprising at least one epoxide group (c) is used in an amount such that the equivalents ratio of epoxide group to isocyanate group of the first polyisocyanate (a) and in the compound (b) is 0.1 to 2.0.

12. The process according to claim 1, wherein the reaction mixture is applied in the presence of a reinforcing material, and subsequently film reaction is carried out to obtain the polyurethane.

13. A polyurethane obtained by the process according to claim 1.

14. A process of making a molded article, comprising:
  injecting the polyurethane according to claim 13 into a molding; and
  curing the polyurethane to form the molded article.

15. The process of making a molded article according to claim 14, wherein the molded article is a vehicle part.

16. The process according to claim 12, wherein the reinforcing material is at least one material selected from the group consisting of a glass fiber, a carbon fiber, and a fiber mat.

17. The process according to claim 1, further comprising, prior to the mixing:
  introducing the alkali metal salt or the alkaline earth metal salt into the urethane group-comprising compound, such that the compound (b) is produced.

18. The process according to claim 1, further comprising, prior to the mixing:
  reacting a second polyisocyanate and an alcohol such that the urethane group-comprising compound is produced; and
  mixing the alkali metal salt or the alkaline earth metal salt with the urethane group-comprising compound, such that the compound (b) is produced.

19. The process according to claim 1, wherein an amount of alkali metal ions or alkaline earth metal ions per isocyanate group in the first polyisocyanate (a) is 0.0001 to 0.3, based on the number of alkali metal ions or alkaline earth metal ions and urethane groups.

20. The process according to claim 1, wherein the compound comprising at least one epoxide group (c) is used in an amount such that the equivalents ratio of epoxide group to isocyanate group of the first polyisocyanate (a) is 0.1 to 2.0.

21. A process for preparing a polyurethane, comprising:
  mixing
    a) a first polyisocyanate,
    b) a compound obtained by introducing at least one of an alkali metal salt and an alkaline earth metal salt into a urethane group-comprising compound, which is present in solid or liquid form at 20° C. and which has a formula of R—NH—CO—O—R', where R is other than hydrogen and COR",
    wherein the compound contains exclusively monodentate urethane groups in relation to the salt anion and/or salt cation of the alkali metal salt and/or the alkaline earth metal salt, and wherein R, R' and R" independently represent organic radicals;
    c) a compound comprising at least one epoxide group,
    optionally d) a polyol,
    optionally e) a chain extender,
    optionally f) a filler, and
    optionally a further additive,
  to form a reaction mixture; and
  reacting the reaction mixture, to obtain the polyurethane,
    wherein an amount of alkali metal ions or alkaline earth metal ions per urethane group in the compound (b) is 0.0001 to 3.5, based on the number of alkali metal ions or alkaline earth metal ions and urethane groups.

22. A process for preparing a polyurethane, comprising:
  mixing
    a) a first polyisocyanate,
    b) a compound (b) obtained by mixing at least one of an alkali metal salt and an alkaline earth metal salt with a urethane group-comprising compound, wherein the urethane group-comprising compound is in solid or liquid form at 20° C. and is obtained by reacting:
      (i) at least one selected from the group consisting of 2,2'-diphenylmethane diisocyanate, 2,4'-diphenylmethane diisocyanate, 4,4'-diphenylmethane diisocyanate, diphenylmethane diisocyanate, isophorone diisocyanate, 2,4-tolylene diisocyanate, 2,6-tolylene diisocyanate, tetramethylene diisocyanate, hexamethylene diisocyanate, naphthylene diisocyanate, oligomers thereof, polycyclic homologs thereof and mixtures thereof, with
      (ii) at least one selected from the group consisting of a monol, a diol and a polyol, to form a monodentate compound;

c) a compound comprising at least one epoxide group,
optionally d) a polyol,
optionally e) a chain extender,
optionally f) a filler, and
optionally a further additive,
to form a reaction mixture; and
reacting the reaction mixture, to obtain the polyurethane,
wherein an amount of alkali metal ions or alkaline earth metal ions per urethane group in the compound (b) is 0.0001 to 3.5, based on the number of alkali metal ions or alkaline earth metal ions and urethane groups.

* * * * *